March 12, 1963 W. W. WOLFORD 3,080,659
CONTAINER GAUGING APPARATUS
Filed March 6, 1961 3 Sheets-Sheet 1

INVENTOR.
WALLACE W. WOLFORD
BY
ATTORNEYS

March 12, 1963   W. W. WOLFORD   3,080,659
CONTAINER GAUGING APPARATUS
Filed March 6, 1961   3 Sheets-Sheet 2
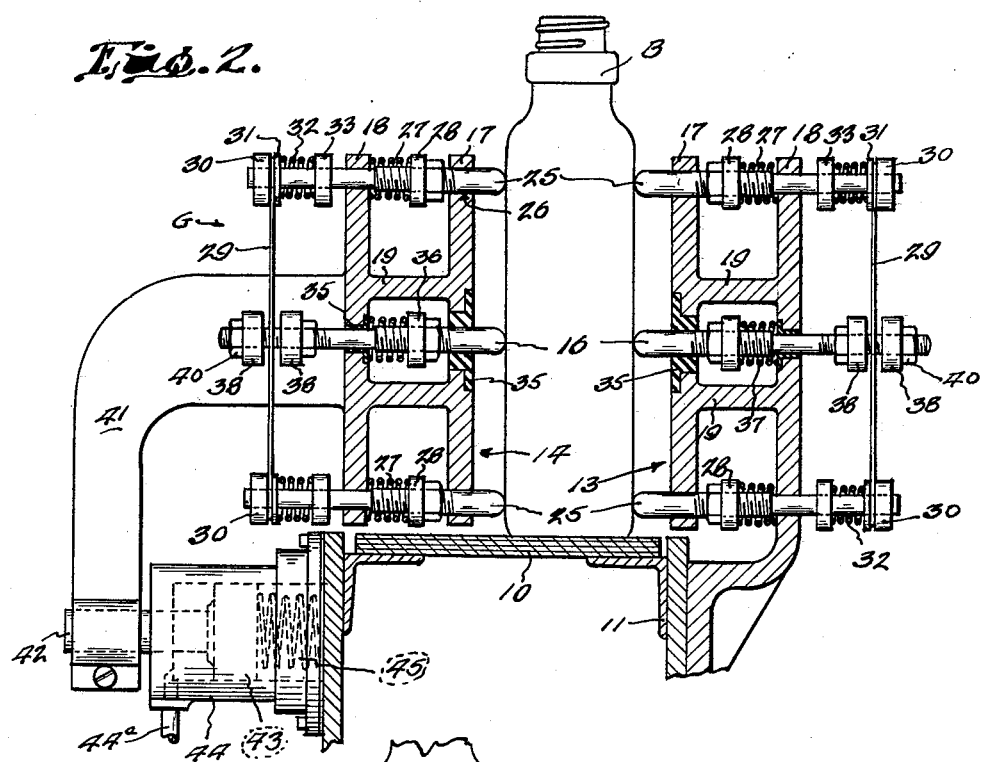
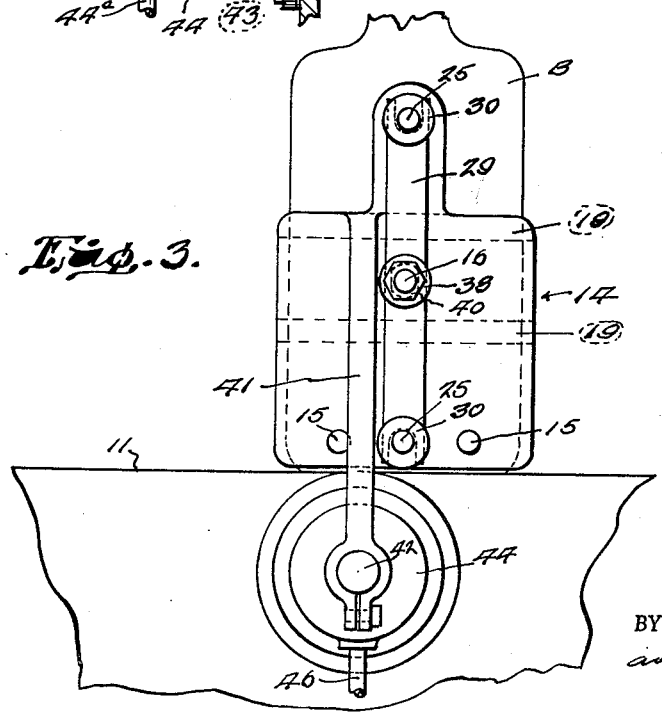
INVENTOR.
WALLACE W. WOLFORD
BY W. A. Schaich
and J. R. Nelson
ATTORNEYS March 12, 1963 W. W. WOLFORD 3,080,659
CONTAINER GAUGING APPARATUS
Filed March 6, 1961 3 Sheets-Sheet 3

INVENTOR.
WALLACE W. WOLFORD
BY W. Q. Schaich
and J. R. Nelson
ATTORNEYS

United States Patent Office 3,080,659
Patented Mar. 12, 1963

3,080,659
CONTAINER GAUGING APPARATUS
Wallace W. Wolford, Oakland, Calif., assignor to Owens-Illinois Glass Company, a corporation of Ohio
Filed Mar. 6, 1961, Ser. No. 93,710
11 Claims. (Cl. 33—174)

My invention relates to container gauging apparatus and more particularly to apparatus for detecting sunken and bulged sides of glass flasks and other flat-sided ware.

An object of my invention is the provision of apparatus capable of being mounted upon a conventional bottle conveyor line and operable to detect defective ware as suggested above and removing or ejecting same from the conveyor.

A further object of my invention is the provision of gauging apparatus of the above character which is capable of simultaneously inspecting both opposed sides of flat-sided flasks or the like containers for contour defects and ejecting those outside of predetermined tolerances.

It is also an object of my invention to provide in an apparatus of the above character, means for detecting and ejecting bottles which are identified as "leaners," particularly those in which the angular position is sufficiently extreme to preclude handling in normal fashion.

Other objects will be in part pointed out and in part apparent hereinafter.

In the accompanying drawings forming a part of my application:

FIG. 2 is a sectional elevational view taken substantially along the plane of line 2—2 of FIG. 1.

FIG. 3 is a fragmentary side elevational view of the reference frame actuating means, this view being of the left side of FIG. 2.

Figure 1:
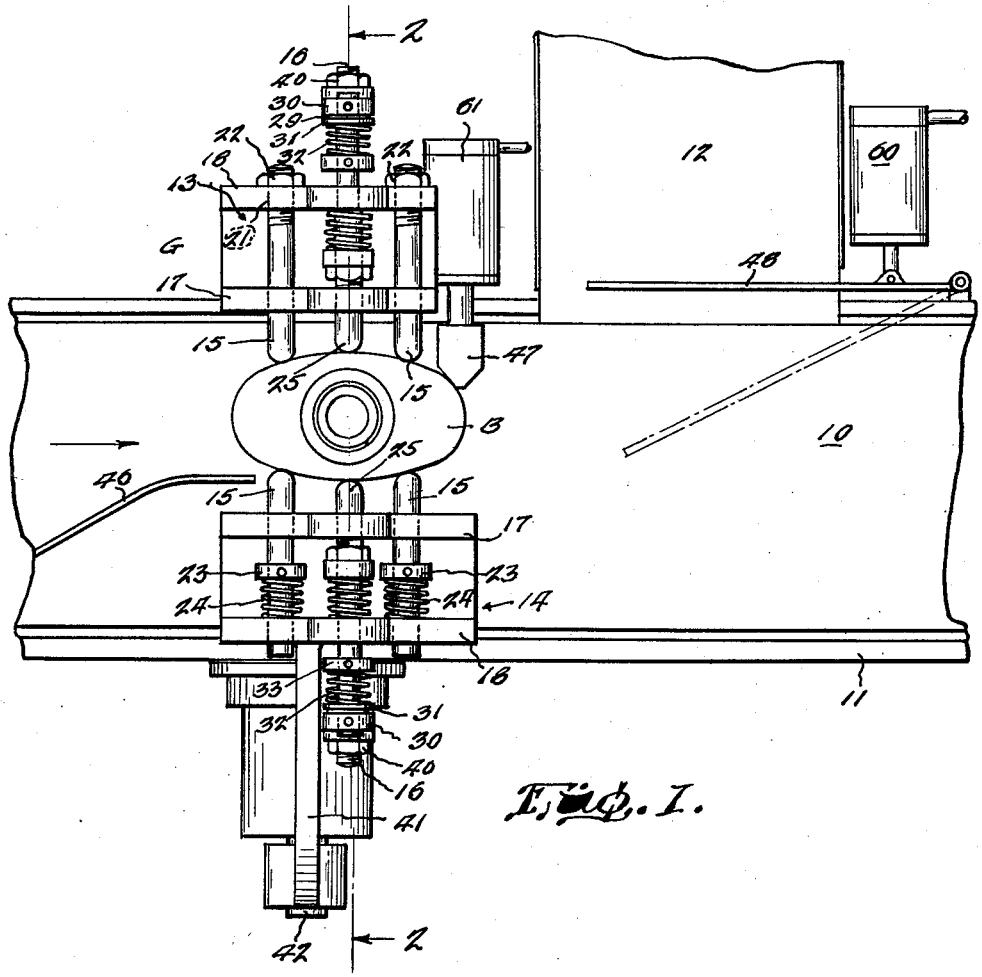
FIG. 1 is a fragmentary top plan view of a typical bottle conveyor line with my gauging apparatus mounted thereon.
Figure 8:
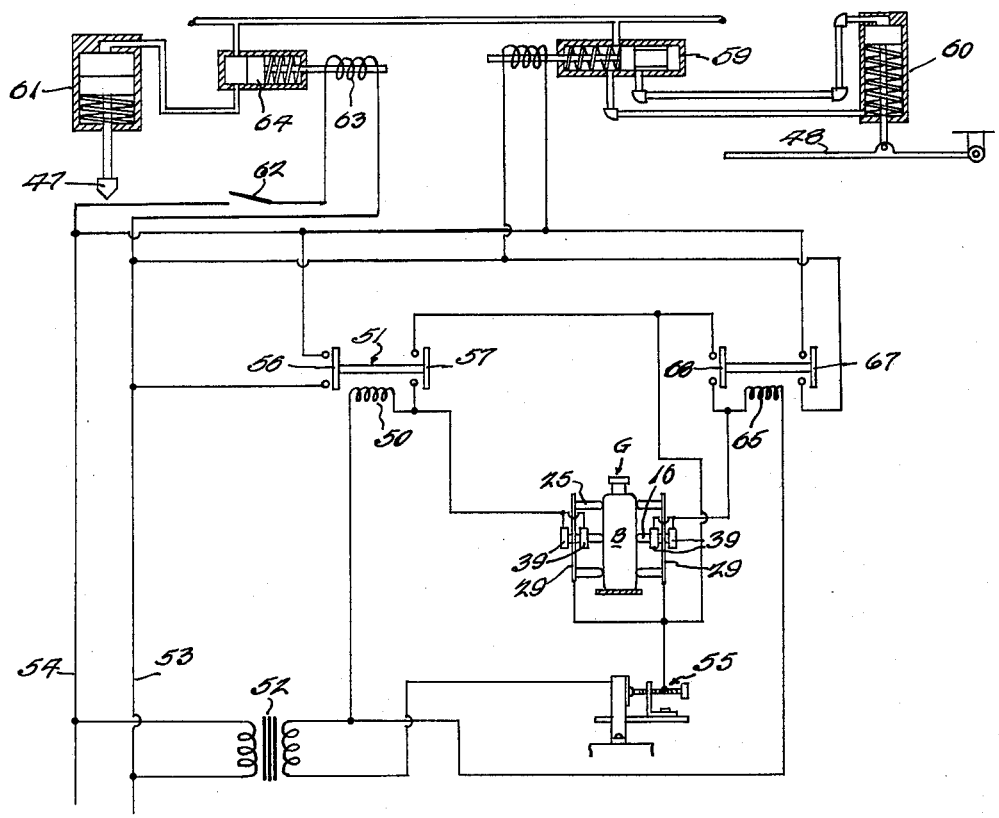
FIG. 8 is an electrical wiring diagram usable with my invention.

My gauging apparatus is illustrated in association with a conventional bottle or jar conveyor line including a horizontal conveyor 10, mounted upon a frame 11. This conveyor may be of the endless belt, or chain type, and driven continuously by a motor (not shown). As shown in FIG. 1, a defective ware receiver 12 is arranged just beyond the gauging apparatus G which incorporates my invention.

This gauging apparatus is intended primarily to gauge bottles, flasks and jars B, having relatively flat opposed sides, as distinguished from round containers. These flasks, for example, are positioned upright upon the conveyor with their opposed relatively flat sides extending generally parallel to the direction of conveyor travel. Thus the containers are ready for easy entry into the gauging zone. Any slight departure from this ideal positioning is corrected by what I identify as container squaring means, such forming a part of the gauging apparatus and designed to function immediately prior to actual gauging of the ware. It may be explained that as a rule any body defects in flasks appear as bulges or depressions in one or both side surfaces.

This apparatus comprises a fixed upright frame 13 at one side of the conveyor 10 and a laterally movable upright frame 14 at the opposite side of said conveyor. These frames are directly opposed to each other and carry container squaring or orienting pins 15 and gauging pins 16, as will be described in detail herein. At the moment a flask is brought to a standstill between these frames, the movable frame advances toward the fixed frame. This performs the two-fold function of first properly finally positioning the flask for gauging purposes and with continuation of such advancing movement, actual gauging of the article. Each frame 13 and 14 may be a casting composed of inner and outer vertical parallel walls 17 and 18 respectively, connected together by a pair of vertically spaced apart horizontal webs 19. At the lower end of each frame is the pair of squaring or flask orienting pins 15.

These pins are in a common horizontal plane and are spaced apart in the direction of the length of the conveyor 10. The spacing apart is such that the pins engage the sides of the flasks near the bottom at rather widely spaced points. Thus, if the flask is not quite properly positioned upon initial entry into the space between the frames, the pins will shift the flask about its axis until all pins are properly in contact with its side surface. Thereupon the flask will have been "squared" and is ready for gauging. Each of the pins 15 in the fixed frame is of substantially greater length than the transverse width of the corresponding frame, being threaded in openings 21 in such frame. A lock nut 22, threaded onto the outer end of each of these two pins, functions to secure them in any adjusted position, as may be required by the specific contour and dimensions of the article being gauged.

The other two orienting pins 15 which are carried by the movable frame 14, are each provided with a stop collar 23 (FIGS. 1 and 2), such being interposed between a coil expansion spring 24 and the outer wall 18 of the movable frame 14. This coil spring 24 functions to normally yieldingly project the pin to its innermost position and this position is regulable by adjusting the stop collar along the pin. For this purpose the collar may be threaded onto the pin.

Reference pins 25, two in number, for each of the fixed and movable frames 13 and 14, respectively, are mounted for limited free axial movement in horizontal apertures 26 provided in the walls of said frames. These pins are spaced apart vertically so that their inner ends may yieldingly contact both extreme upper and lower side areas of the flask body. A coil spring 27 encircles each reference pin 25 between the outer frame wall and an axially adjustable stop collar 28 which may be threaded onto the pin. By adjusting the position of the stop collar the innermost position of the pin may be regulably controlled. The outer end of each reference pin 25 is connected to an end of a reference plate 29 which occupies a position I identify as a reference plane. Thus a vertically disposed reference plate, a conducting metal strip connects each vertically spaced pair of reference pins, such plate lying in a plane parallel with that in which a properly contoured side wall of a bottle being gauged, will lie. At the outer end of each reference pin is a retaining collar 30 against the inner side of which the reference plate is yieldingly held by a spring pressed washer 31. A coil spring 32 encircling the pin between said washer and a ring 33 carried by said pin, bears against said washer.

The gauging pin 16 (FIGS. 2 and 3) is carried by each frame, such being mounted for horizontal axial movement toward and away from the article accommodating space between said frames. This pin is electrically insulated from its supporting frame by collars or inserts 35 of hard rubber or similar insulation for the reason that it functions as a circuit closer, or switch, as will be apparent presently. An axially adjustable stop collar 36 threaded onto each gauging pin 16 is engaged by a coil expansion spring 37 which normally yieldingly urges the pins to their innermost positions for contact with opposed medial body areas of a flask, or such article. At the outer end of each gauging pin 16 are collars 38 or sleeves forming electrical contacts, these being arranged one on each side of and spaced from the reference plate 29. Each of these collars is threaded onto its carrying pin and is locked in any adjusted position by a nut 40 or the like device. The spacing between these contacts and the reference plate, as will be apparent presently, predetermines the magnitude of a defect required to cause ejection of a bottle, or flask.

As mentioned heretofore, one of the pin carrying frames is movable. To this end the movable frame 14, at the left side of FIG. 2 is supported at the upper end of a generally inverted L-shape bracket 41. This bracket is mounted upon an extension of a piston rod 42 forming part of an air motor. The piston 43 which carries said rod 42 is mounted in a horizontal cylinder 44 which in turn is attached to the conveyor frame 11, or some other suitable support. A coil spring 45 yieldingly holds the piston 43 and therefore the frame 14, in their outermost positions. An air conduit 44ª connected to the forward end of the motor cylinder provides means for introducing air under pressure into the motor, thereby causing projection of the movable frame and contact between opposed sides of the flask body with the gauging pins. With such contact between these pins and the flask sides, they remain either in their normal positions, provided, however, the contacted medial surfaces are in or substantially in the vertical plane of the upper and lower areas contacted by the reference pins, or move axially inwardly, or outwardly, depending upon whether such movement is caused by a bulged or a sunken area. In either event, if the defect is of sufficient magnitude, an electrical circuit is closed by engagement of one of the contacts 39 with the reference plate 29.

A flask approaching the gauging zone, if not already properly oriented and positioned, will be moved by the deflector arm 46 (FIG. 1) so that it enters the space provided between the pair of gauging pins 34. Upon arriving at the gauging position a stop 47 is projected into engagement with the foremost end of the flask to thereby hold it stationary during the inspecting cycle. In the event the flask meets the normal requirements, it, of course, is released from the gauging apparatus and moves along the conveyor to an accumulator table (not shown). If, however, the flask is defective, a pivoted gate 48 (FIG. 1) is quickly moved from the full line position to that indicated in dotted lines. Thus the imperfect flask is removed from the main conveyor and placed upon the reject table or receiver 12.

The foregoing operations are electrically controlled and performed in proper sequence as determined by a timer (not shown) which may be of a type available in the open market, such comprising, for example, a series of motor driven cams, the latter actuating micro-switches. The electric circuitry I employ and have illustrated herein is merely one example of many capable of performing the intended functions.

By reference to FIGS. 4-8, it will be observed that if, for example, the left side of the flask (FIGS. 5 and 7) is either bulged or sunken (the illustration being exaggerated in the interest of clarity) one of the two contacts 39 will touch the reference plate 29 and establish a circuit through the coil 50 of a relay 51, said coil being in circuit with the secondary of a transformer 52 which receives current from the supply mains 53 and 54. The circuit may be traced from the transformer 52 through coil 50, the contacts 39, and reference plate 29 to a timer actuated switch 55, which, until a flask enters the gauging zone, is open. This switch is then closed by a motor operated cam (not shown) as explained above. With closing of this circuit for the relay magnet coil 50, the switch contacts 56 and 57 move to closed positions. The contact 56 completes a circuit including a magnet coil 58 which actuates a solenoid valve 59. Opening of this valve admits air under pressure to actuate an air motor 60 which in turn projects the gate 48 into the path of travel of the defective flask. Thus the defective flask is directed onto the receiver 49. It is understood that prior to the above gauging cycle being initiated, the stop 47 will have been projected into the path of the flask by an air motor 61 (FIGS. 1 and 8) as a result of the switch 62 being closed by a timer cam (not shown). The closing of said switch 62 causes energization of the magnet coil 63 and this in turn actuates a solenoid valve 64 by which flow of air under pressure to the motor 61 is controlled.

In the event a defect, as above described, is present on the right hand side of the flask, one of the contacts 39 will engage the corresponding reference plate and cause energization of the coil 65 which actuates the relay 66, thereby closing the contacts 67 and 68. With closing of the contact 67, the coil 58 actuates the gate controlling air motor 60. Thus a defect of given magnitude causes projection of the gate to remove the defective article from the main conveyor. With completion of a gauging operation the stop 48 is retracted and the conveyor advances the flask. The gate, of course, if projected in response to the detection of a defect, is so held until the flask has been deflected to the receiver 12.

Figure 4:
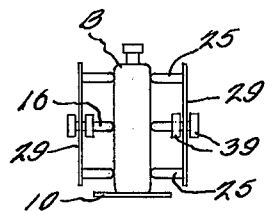
FIGS. 4, 5, 6 and 7 are views more or less diagrammatically illustrating various contours and glass conditions which my apparatus may detect.
Figure 7:
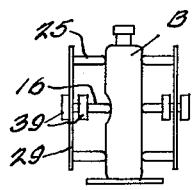
Figure 5:
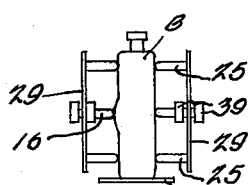
Figure 6:
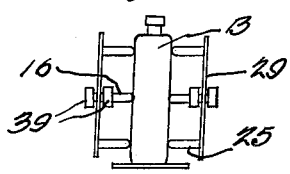

In FIG. 4 I have shown the gauging apparatus elements in the positions they occupy when a marketable flask enters and moves through the inspecting zone. The stop 47 holds the flask momentarily as determined by the motor actuated switch closing cam (not shown). In FIG. 6 a so-called leaner is shown. Here the flask bottom is improperly formed and if not too imperfect will permit the flask to pass inspection since the body surfaces are not objectionable.

Modifications may be resorted to within the spirit and scope of the appended claims.

I claim:

1. Gauging apparatus comprising a stationary upright frame, a horizontally movable upright frame in opposed relationship to the stationary frame positioned to provide a space between the frames for accommodating an article to be gauged, opposed article orienting means carried by the frames for angularly positioning the article between the frames, a pair of vertically spaced apart horizontal reference pins carried by and extending through each of the frames, the pins each having an inner end for contact with opposed vertically spaced apart areas of the article, a gauging pin carried by each frame intermediate the reference pins, means yieldingly urging each gauging pin axially inward toward the article accommodating space, and means actuated by axial movement of either gauging pin a predetermined distance relative to an imaginary line connecting the inner ends of the corresponding pair of vertically spaced reference pins for closing an electrical circuit and causing ejection of an article.

2. Gauging apparatus as defined in claim 1, there being an electric current conductive reference plate connecting the outer ends of each pair of reference pins, and a pair of electric contacts carried by each gauging pin positioned for engagement one at a time with the reference plate in response to axial movement of the gauging pin.

3. Gauging apparatus as defined in claim 2, the electric contacts being a pair of collars positioned one at each side of the corresponding reference plate and means for adjusting the collars axially of the pin whereby to predetermine the degree of pin movement required to close the circuit.

4. In gauging apparatus as defined in claim 1, means for placing an article between said frames and means for advancing the movable frame to grasp the article between the orienting pins.

5. In gauging apparatus as defined in claim 4, the reference and gauging pins having inner article contacting ends engageable with the article in response to movement of the movable frame beyond the point at which the orienting pins contact the article.

6. Gauging apparatus as defined in claim 1, the orienting pins carried by the stationary frame being rigidly mounted and means yieldingly urging the orienting pins carried by the movable frame toward the article.

7. Gauging apparatus as defined in claim 1, there being an electric current conductive reference plate outwardly of each frame, said plate lying in a plane parallel to said imaginary line, and a pair of electric contacts movable by each gauging pin into circuit closing contact with opposed faces of the reference plate one at a time.

8. Gauging apparatus as defined in claim 7, the electric contacts being collars carried by and individually adjustable axially along each gauging pin.

9. Gauging apparatus as defined in claim 8, and means yieldingly urging the gauging pins axially toward each other.

10. Gauging apparatus comprising a fixed upright frame at one side of a conveyor, a horizontally movable upright frame directly opposite the fixed frame, means for advancing the movable frame toward the fixed frame at regular time intervals, article orienting pins carried by said frames for angularly positioning an article for gauging, reference pins carried by the frames and contactable with vertically spaced areas of opposed sides of an article in response to advance of the movable frame, a gauging pin on each frame between the reference pins, said gauging pins each mounted for axial movement into contact with an area of an article between those areas contacted by the reference pins, and means actuated by axial movement of the gauging pins a predetermined extent to cause ejection of a gauged article.

11. A combination as desfined in claim 10, an electric current conductive reference plate connecting the reference pins carried by each frame, and a pair of electric contacts on each gauging pin, the contacts being arranged one at each side of the corresponding reference plate.

References Cited in the file of this patent

UNITED STATES PATENTS

| | | |
|---|---|---|
| 1,682,464 | Arelt | Aug. 28, 1928 |
| 2,854,756 | Aller | Oct. 7, 1958 |
| 2,937,749 | Strzala | May 24, 1960 |